United States Patent Office 3,482,147
Patented Dec. 2, 1969

3,482,147
MIXER CONTROL DESKS, PARTICULARLY FOR RADIO CASTING STUDIOS
Hans Kersten, 4 Klosterstieg, 2 Hamburg 13, Germany
Filed Apr. 20, 1967, Ser. No. 632,319
Claims priority, application Germany, Apr. 22, 1966,
J 30,660
Int. Cl. H02b 1/04, 9/00
U.S. Cl. 317—101                    9 Claims

ABSTRACT OF THE DISCLOSURE

A mixer control desk for radio or broadcasting studios with variable operating circuitry, adaptable to different operating conditions, comprises distinct units so constructed that these units can be plugged into supporting sockets, wherein the said supporting sockets are detachably connected with a cross-linking connecting insert mounted perpendicularly to the said sockets and carrying the wiring for the sockets and for the external terminals of the mixer desk, and wherein the units contain independent functional units and have identical dimensions in height and width, whilst their length may be equal to, or a multiple of, a basic length.

BACKGROUND OF THE INVENTION

The present invention relates to a mixer control desk, more particularly for broadcasting studios, with variable operating circuit and variable spatial arrangement of the components of the control set-up within the operating surface of the mixer desk.

The term operating circuit of a control arrangement may be defined as the linking of its components in accordance with a symbolic wiring diagram for a certain operational purpose, including all given switching and operating possibilities. In addition, the term operating circuit is frequently also used to mean the technical execution of this linking, that is to say, the wiring, including therein the connecting means (contact bars, and the like).

Variable operating circuits of different kinds are known in the art. There are, mainly in valve engineering, sound mixer desks containing in the operating panel substantially only the operating elements, elsewhere in the desks or in racks the amplifiers, pack boards and the like, to which the inputs and outputs of these apparatus can be connected. The operating panel, the space between the same and the apparatus and instruments, as well as the distributing panel, contain fixed, usually very bulky, cable trees. The fitting of the racks and the plug-in units with the apparatus are, in view of the blocking facilities, as fixed as the switching capabilities within the distributor. This is not changed even by the fact that certain units may be exchangeable and that some of these units are housed in the table top.

In addition to this first type of mixer desk, there is also a second type in which the operating means are combined with the amplifiers in so-called plug-in units so that these comprise substantially the elements of a larger functional groups. Such a group may form, for example, a microphone channel, comprising the microphone amplifier, the control regulator, an equalizer for high and low frequencies, a hall regulator, various switches, the monitoring key, etc. enabling the wiring to be simplified. Here, the switches replace switching functions of a sometimes remote distributing panel.

In another known construction, the plug-in unit is a housing in which individual amplifiers or units are inserted, and other parts, e.g., transducers are fixed. Different equipment requires here different housing constructions of the plug-in units.

Yet another known construction comprises units which are mounted open on a common rail and are wired together. The common housing members are formed by lateral cover sheets having the length of the plug-in insert.

The three constructions using compact plug-in insert units have the common feature that spatial or electrical changes are not possible without structural changes, or at least without assembly and soldering work. In addition, it has only been possible to equip with some completeness only certain units, e.g., microphone channels, whilst other parts, e.g., transducers, power packs, and the like, were not included and were fitted into the fixed construction of the desk or in additional racks.

All these known constructions have to some extent the following drawbacks. In view of the intended purpose of the control device, each desk must be individually constructed. It has been shown repeatedly that the requirements of control are so individualistic that it is practically impossible to manufacture identical control mixer desks in any appreciable series, with the exception only of small, usually transportable, installations which, however, require compromise solutions and offer only a limited operational scope.

To avoid excessively extensive intermediate distributors (jack boards, etc.), in addition to the equipment of the apparatus also the normally provided operating circuit must be fixed, which can be deviated from only to the extent to which distributing equipment has been provided. In consequence, the planning of a larger control arrangement must be started some 12 to 24 months before its delivery, and practically changes in the future application occur already before its delivery date and may require expensive reconstructions. A typical example of such changes is the introduction of stereophonic equipment, which took place within a comparatively short period of time.

Another drawback is the difficult accessibility of the wiring which is firmly connected with the mechanical construction of the desk, the plug-in carriers and other plug-in devices, the fixed switches, etc. Since, for example, a mixer desk fitted against a wall is not accessible from the back, the solution frequently adopted is to construct the table top or parts thereof so that they can be folded open. Their weight necessitates often special holding devices and in some cases hydraulic holding devices have been necessary. The bulky cable trees or harnesses must be retained flexible by means of long loops. The location of faults and repairs are very complicated in these installations. Smaller installations must often be dislocated to enable the wiring to be made accessible.

Another drawback is that the cable loom must be fitted and connected into the installed mixer desk. This work can usually be carried out by a single person only and may require several hundred working hours. Since even after planning, the individual construction, the mechanical construction and the wiring must follow each other in temporal sequence, the "basic equipment" may require several months to build. The mixer desk under construction occupies valuable workshop space, and considerable amounts of capital are tied down.

Hence it is obvious that the costs of the "basic equipment," i.e., the mixer desk less the instruments, may reach some 30 to 50 percent of the total price and may in many cases even be above this value.

Finally, if changes become necessary in the operating circuit, reconstructions are required which render the mixer desk inoperational for prolonged periods. This also eliminates studio recording for some considerable time and may be highly uneconomical, owing to the uneconomical use of the appliances. Generally, this is overcome by making the necessary changes not when they are technically necessary, but during off-peak periods, for example, during the main vacations.

SUMMARY OF THE INVENTION

The present invention has the object of poviding a mixer control desk, the operational circuit of which can be adapted quickly to widely different operational conditions by changing structural units.

According to the invention this object is realized by a mixer desk, having a flat carrier construction which has connected thereto detachably several narrow carrier sockets, arranged in side-by-side mounting and having preferably the same width, and perpendicularly thereto at least one transverse connecting insert. One carrier socket carries one or more structural units, having the same height and preferably also the same width, and possibly different length. The carrier sockets carry also the wiring necessary for connecting these units. All these supporting carrier sockets are adapted to be plugged into the transverse connector which carries the wiring for interconnecting the said sockets and for the external terminals of the mixer desk.

In order to enable such a mixer desk to be adapted simply to a certain operation, according to a further feature of the invention the active members of the mixer desk, such as amplifiers, limiters and the like, as well as the monitoring, controls and supply devices, etc., form structurally independent units with the same width and height, and are combined according to their functions on the carrier sockets in plug-in arrangement so as to form units of identical lengths.

According to yet another feature of the invention, the carrier sockets and the transverse connector house the wiring necessary for interconnecting the carrier sockets and for connecting the external terminals.

Both the arrangement in space of the components of the mixer desk on the operating surface thereof, and the wiring itself, are variable without structural changes. The functional change in the wiring is made possible by dividing the same into longitudinal and transverse portions adapted to be changed by plug-in connections. To this end, the individual parts of the wiring are not firmly connected to the mechanical supporting structure of the mixer desk but to the interchangeable elements. These elements consist of carrier sockets onto which are fitted the different structural units of which, for example, a complete microphone channel is composed, and combined to a plug-in unit, and of a transverse plug-in connector arranged in the rearward portion of the mixer desk perpendicularly to the plug-in units, which are mounted parallel to each other.

The structural units are so formed that they contain independent functional units and have uniform height and width, while their length may be a single or multiple of a basic length unit. Preferably two or more adjacent carrier sockets or one correspondingly wider carrier socket are used for wider units so that the plug-in unit may have a width which is a multiple of that of a socket. The units may be composed of amplifiers, associated regulators, switches and the like, or they may contain individual active components of the control chain, for example equalizers and limiters, as well as passive components, such as for example, stereo rectifiers, as well as, in other inserts, control devices, modulation meters and other monitoring devices, as well as power packs and the like.

The structural elements are so combined in a plug-in unit that they are fitted on to the carrier sockets from above. The carrier sockets have a certain predetermined length, uniform for the mixer desk, and governed by the most complex plug-in insert, in practice invariably by the microphone channel. The carrier socket contains the electrical connection between the structural elements and the wiring to the contact strip mounted at its end with the external terminals of the insert, i.e., the terminals leading to the transverse connector. In addition, the lower side of the carrier socket has an arrangement for mechanically guiding it on the flat supporting structure. The structural elements have each its own housing and contact strip for connecting it with the wiring of the carrier socket, wherein the pair of contacts strips preferably combines inside the structural element when the same is fitted.

In principle, the transverse connector insert contains no apparatus. It has only the object of interconnecting the parts of the control equipment, combined to plug-in inserts, and of connecting the same with the input and output leads of the mixer desk. To this end it comprises the mating strips for the contacts strips of the inserts, the contact strips for the inputs and outputs of the whole control installation, the keys and switches for selecting the connections of the plug-in inserts (programming means), and the wiring between all these elements. By arranging the programming means in the transverse connector insert, the structural elements can be made uniformly, irrespective of, say, to how many busbars the output of the microphone channel should be connectable in the mixer desk.

In addition to the aforementioned features, the invention also comprises the following preferred and advantageous features: The contact strips and the mounting means for the carrier socket, comprising, for example, a screw connection, a locking or tightening mechanism, or the like, have generally a fixed place in each structural element, in that their distances from one end of the element in the longitudinal direction thereof are fixed. As with other metal unit constructions, the carrier sockets have over their entire length all bores for contact strips and mixing devices in the unit dimension of the basic length, with the addition of any different bores for elements occurring frequently in the same position. The continuous unit dimension bore makes possible in all other cases the free choice of the sequence in which the elements are fitted onto the carrier socket.

By aligning according to a further feature of the invention the structural elements, for example, by the meander-shaped toothing of their adjacent cover plates edges, any twisting of the plug-in insert may be substantially prevented.

The transverse connecting insert may preferably have the following additional features according to the invention. The programming means are combined to form one or more structural units, and are wired prior to being fitted into the transverse connector, or may even be wired to the connecting terminal strip to the carrier socket. In order to facilitate their maintenance and exchange, they may be of the plug-in type, engaging contact strips, or they may be easily accessible by means of long and flexible leads.

The cable loom in the transverse connector is preferably mounted on an auxiliary support carrying conveniently the contact strips connected therewith. This facilitates substantially the soldering operations.

Since in the case of a change of the operating circuit only a small part of the wiring in the transverse connector insert may have to be altered or changed, according to the invention a part of the cable loom may be a priori detachable, and preferably exchangeable by means of contact strips.

For different reasons, for example keeping stocks of prefabricated length of the cable loom in the transverse connector, it may be advantageous, according to a further feature of the invention, to sub-divide the cable loom also longitudinally and to interconnect its parts by contact strips or screw connectors, the latter being preferred especially with current supply rails which should have large cross-sections in order to achieve negligibly small side-to-side unbalances.

Since the plug-in units have a uniform, comparatively small width (generally of the order of 40 millimetres), large parts of the control mechanism, and mainly the mirror instrument of the volume indicator, cannot be fitted into the plug-in unit. Apart from that, for example, the mirror instruments belongs already functionally into a central position in the rearward part of the mixer desk. According to the invention, these components are adapted to be plugged into the transverse connector, or at least are so mounted that they can be easily detached, without having to dismantle the transverse connector from the flat supporting structure.

BRIEF DESCRIPTION OF THE DRAWINGS

Further features of the invention will be described, by way of example, in the following description, with reference to the accompanying drawings, in which.

Figure 1:
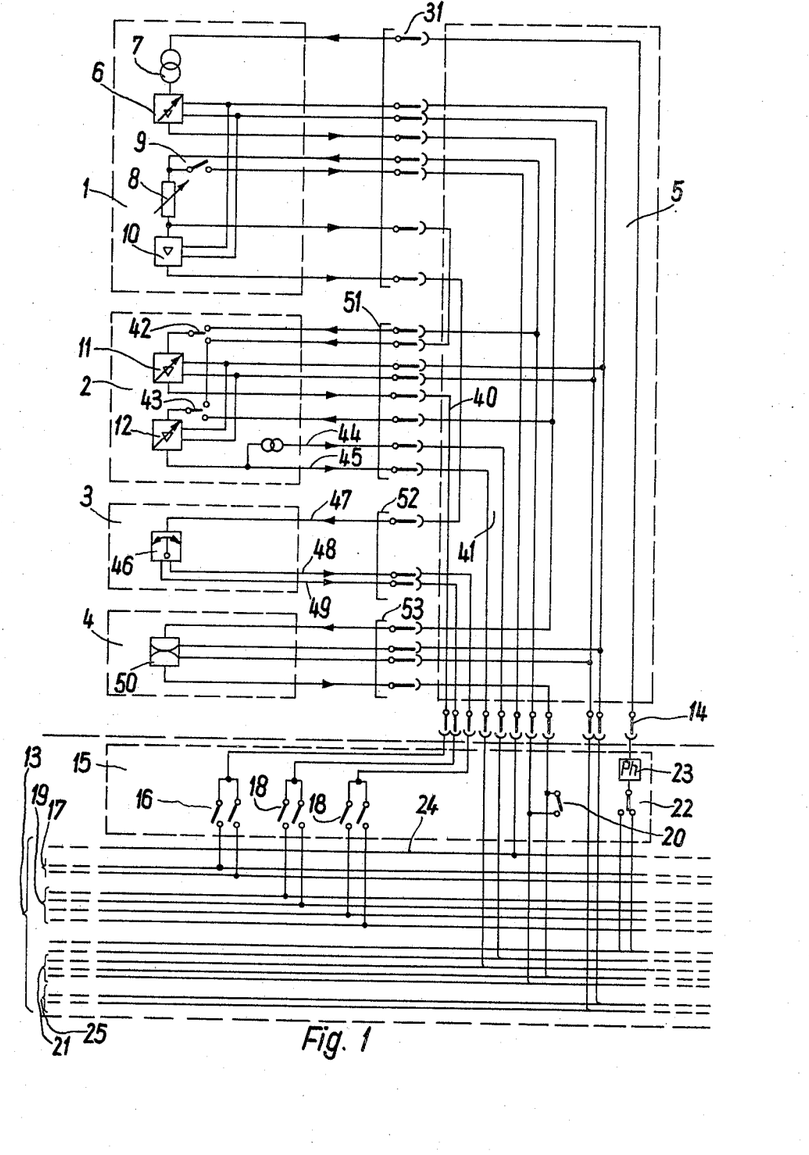
FIG. 1 is a simplified block diagram of a microphone channel equipped for stereophony transmission.
Figure 2:
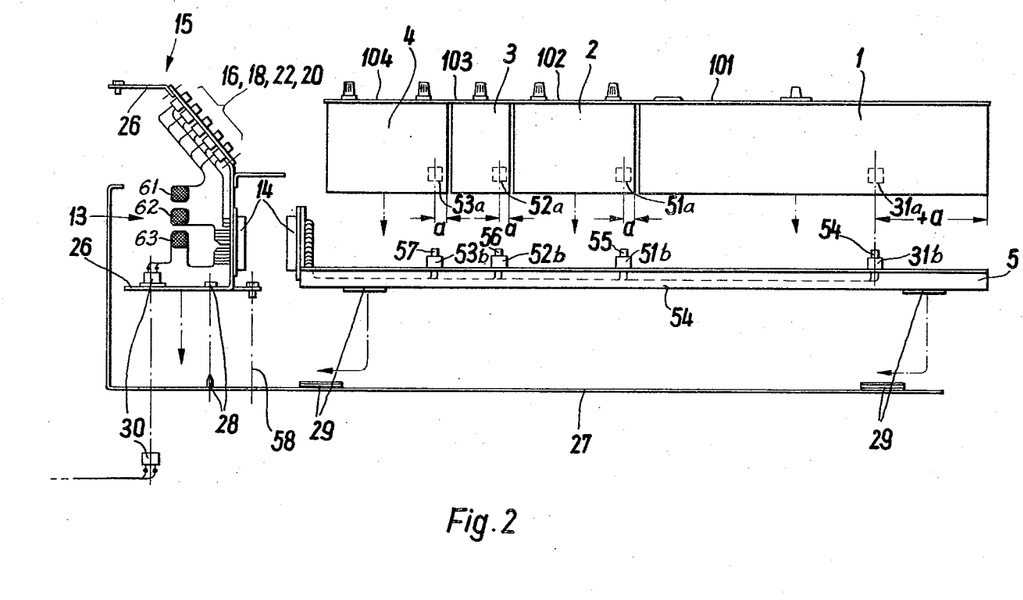
FIG. 2 is a side elevation of the plug-in unit resulting from the construction of FIG. 1, with carrier socket and structural elements and with the associated transverse connector, and shows the flat supporting structure.

According to FIG. 1, the plug-in unit, forming the microphone channel, consists of the structural elements 1 to 4, shown in frames, and the carrier socket 5. Each structural element is housed in its own housing 101 to 104 (FIG. 2). The structural element 1 contains the basic components which form part of every microphone channel without regard to its size and equipment. These are: the variable gain microphone amplifier (input amplifier) 6 with input transducer 7, the control regulator 8, the monitor key 9 and the intermediate amplifier 10 for the reaction-free supply of the microphone busbar 19. The element 2 contains two variable separating amplifiers 11 and 12 for branching off the Hall path 40 and the balancing path 41. Both amplifiers have input-side switches 42, 43 for selecting the branching off points, and the balancing amplifier has also a symmetrical output 44 and a non-symmetrical output 45. The element 3 contains a stereo control 46 (panoramatic potentiometer) with an input 47 and two outputs 48, 49 for distributing the programme to the left and right stereo channels. The element 4 consists of an active equalizer 50, i.e., an equalizer equipped with amplifier, for affecting the frequency response.

In the carrier socket 5 (FIG. 2), these elements 1 to 4 are electrically interconnected. The electrical sequence of the amplifiers etc., in the signal path deviates generally from the physical arrangement of the structural elements, because this is usually given by the frequency and the timing of the operation. Preparatory adjusting means are usually ararnged remotely from the sound engineer. The current path is indicated in FIGURE 1 by arrows; the connection with the structural elements is effected by means of contact stripes 31a, 31b, 51a, 51b, 52a, 52b, 53a and 53b.

Each contact strip consists of two parts. The strips 31a 51a, 52a and 53a of the units 1, 2, 3, and 4 are arranged within the same, and the counter-strips 31b, 51b, 52b and 53b mounted on the carrier socket 5, extend into the interior of the elements.

The cable loom 54 in the carrier socket is connected with the transversely extending wiring 61, 62, 63 in the cable chamber 13 of the transverse connector insert 15 through a contact bar 14 partly directly, partly through the programming means 16, 18, 20, 22, shown framed as a structural element. These are: the selector keys 16 for selecting the audio collector rails 17, the selector keys 18 for preselecting the microphone collector rails 19 which supply four group channels and are divided in this case into two stereo pairs, bridging key 20 between the feed and return 21 for external formation means (effect filters, etc.) to be faded in, a switch 22 for chosing between two sources of signals (microphones) and a phase reversal key 23 for checking the correctness of the stereo sound picture. In practice, further programming aids are added (e.g., for coupling the stereo channels), but these have been omitted in this instance, in order to render the representation clearer, and to facilitate the explanation of the principle of the invention.

The bus bars 17 (sound), 19 (microphone), 24 (pre-audio path) and 25 (supply) lead to other insert units, the remaining cable looms collect leads (indicated by arcs in the drawing) to the contact strips 30 for the external terminals of the mixer desk.

FIG. 2 shows in side elevation the plug-in unit resulting according to FIGURE 1. The drawing shows, in side-by-side arrangement: the carrier socket with the structural elements and the associated transverse connector insert. Insofar as possible, the same notation has been used as in FIG. 1. The structural elements 1 to 4 are fitted through their pairs of contact strips 31a, 31b, 51a, 51b, 52a, 52b, 53a and 53b on to the carrier socket 5. Each pair of contact strips consists of a plug part and a socket portion, of which the one parts 31a, 51a, 52a, 53a are mounted within the interior of the element unit and the other parts 31b, 51b, 52b, 53b (FIG. 2) on the carrier socket. The carrier socket 5 carries inside the cable loom 54 with the connections to the terminal strip 14. The distance $a$ between the contact strips 51a, 51b, 52a, 52b, 53a and 53b from the right limiting edge of each unit is uniform, with the exception of unit 1 to which are assigned the contact strips 31a and 31b. The cross connection insert, with the housing 26, the cable conduit 31 running cross-wise and the programming means 16, 18, 20 and 22 placed, in the example shown in FIG. 2, from the top onto the plane supporting structure 27, which latter is free of electrical components, and secured in position by fasteners such as screws 58. A centering device 28, comprising a pin on the supporting structure 27 and an orifice on the part 26 assures the accurate positioning. In this embodiment, the carrier structure is a flat plate, angled at one side, but it may also have another suitable shape. The completely equipped plug-in unit (1–5, 14) are then, as indicated, pushed in via the guides 29 and detachably fixed, wherein the guides consist of complementary rail sections. Through the contact strips 30, the external inputs and outputs of the mixer desk are connected to the transverse connecting insert.

Figure 3:
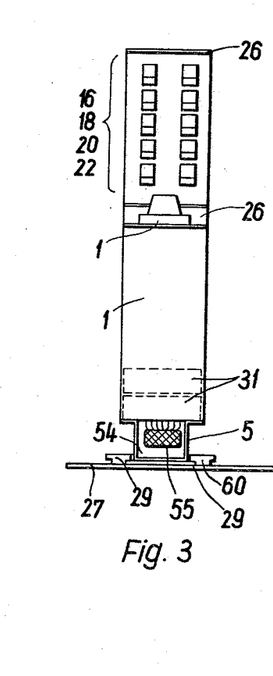
FIG. 3 shows the arrangement of FIG. 2 in the assembled state and in front elevation.

FIG. 3 shows the arrangement of FIG. 2, viewed in the longitudinal direction. The carrier socket 5 has a substantially U-shaped cross-section and is held by the guide rails 29 with flanges 60 engaging thereunder. The programming means 16, 18, 20, 22 are indicated in the background above the unit 1.

Figure 4:
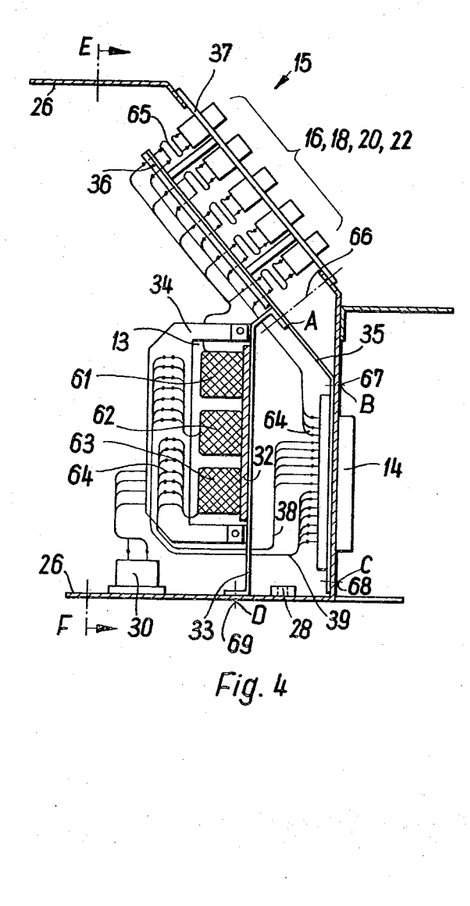
FIG. 4 is a cross-section of the rearward portion of the mixer control desk with the transverse connector.

FIG. 4 shows in cross-section and by way of explanation of the principle of the invention, a detailed representation of the transverse connector insert in the rear part of the mixer desk, wherein the wiring has been pre-assembled by means of an auxiliary harness.

The cable loom 13 consisting of three strands 61, 62, 63 is fixed on a rail 32 and has the branches tapped off in accordance with dimensioning (width) of the plug-in units. The upper cable strand 61 carries the busbars which connect all microphone and group channels via the programming means, the centre strand 62 carries the individual links between these channels and certain plug-in inserts (pre-audio, monitoring, sound level etc.) and the bottom strand 63 carries finally the direct connections to the input and output terminals of the mixer desk. These connections are connected to the contact strips 30 at other points of the transverse connector than in the cross-section shown.

The further details may be demonstrated most easily with reference to the progressive construction of the transverse connector insert. The rail 32 is connected at every channel cross-section with a strap 33 and on this a suitably cut insulating plate 34 is mounted extending over the cable loom 13. This insulating plate 34 carries soldering points to which the branched off leads of the two lower cable strands 62, 63 are soldered.

A second strap 35 carries a portion of the contact strip 14 and a terminal plate 36 with soldering points 65 for the programming means 16, 18, 20, 22 which are combined on the mounting plate 37. The corresponding connections of the contact strip 14 and input terminals of a terminal plate 36 are already wired up; the flexible leads 65 to the programming means 16, 18, 20, 22 are also soldered on one side to the terminal plate 36. The cable strands 38 and 39 are also connected on one side to the left side of the contact strip 14, as viewed in FIG. 4, and lead to the cable strands 62, 63.

After assembling the straps 33 and 35 at the point A by means of screws 66, the cable strands 38 and 39 are soldered to the terminal plate 34, and the branches from the upper cable strand 61 to the output terminals of the terminal plate 36. Then the wiring mounted on the auxiliary harness 32, 33, 35 is ready for fitting in the housing 26, in which it is mounted at B, C and D, such as by screws 67, 68, 69. Then the programming means 16, 18, 20, 22 are soldered to the free lead ends and the mounting plate 37 is fitted, the contact strips 30 are screwed on and finally stiffeners are fitted along the lines E-F as indicated.

After the fitting of the finished transverse connector insert 15 from above by means of the centering device 28 and the fixing—which may also be effected by locking without any tools—in the carrier structure 27, the plug-in units may be inserted and the contact strips 30 connected. The mixer desk is ready for use.

Figure 5:
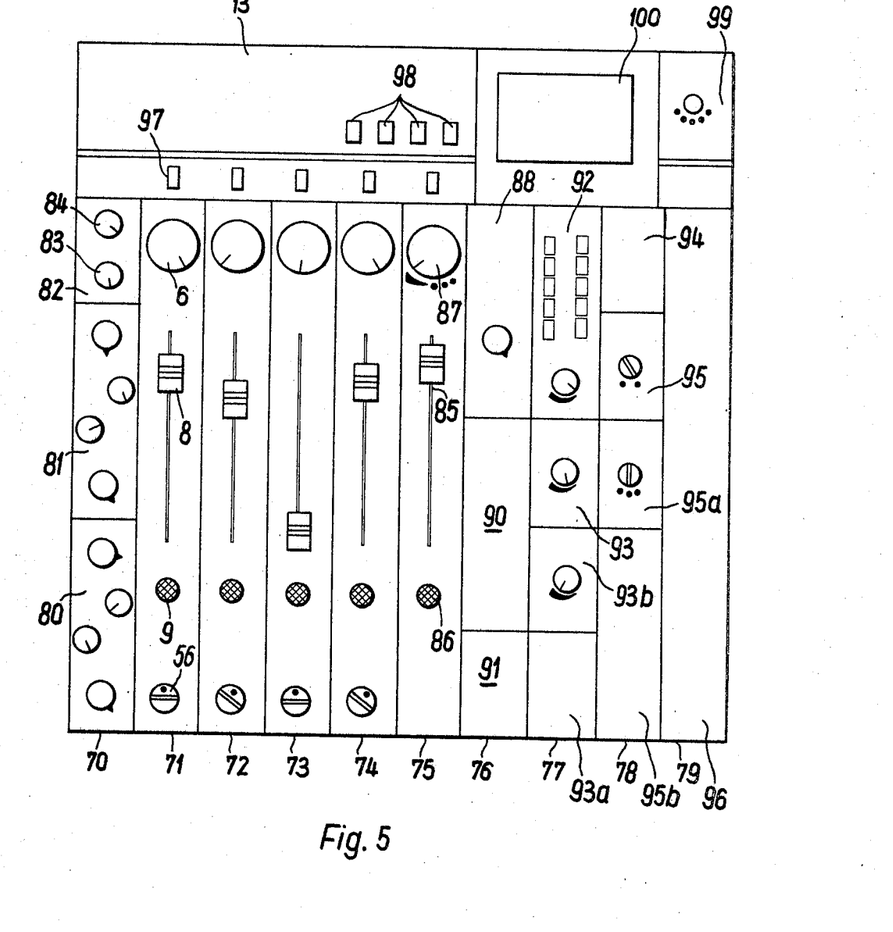
FIG. 5 is the operating panel of a transportable mixer control desk.

FIG. 5 shows diagrammatically the control panel of a small operational mixer control desk for outside broadcasting units, viewed from above. This mixer desk contains ten plug-in sets 70-79 with the same width, amounting in this case to 40 mm. The length of one plug-in unit is 64 mm. or a multiple thereof. Starting from the left, the first plug-in set 70 contains two equalizers 80, 81 and a unit 82 with two switches 83, 84 for applying the equalizers to a microphone or main channel 71 to 75. Then follow four microphone channels 71 to 75, each occupying the whole length of a plug-in set. One microphone channel contains the microphone and intermediate amplifier (see FIG. 1 unit 1, parts 6 and 10), the control regulator (FIG. 1, flat regulator 8), one footfall sound filter 56 the listening-in key (FIG. 1, part 9) and the control elements for adjusting the microphone amplifier (FIG. 1, part 6). The sixth plug-in set 75 contains the so-called main channel with the main regulator 85, the listening-in key 86 and the transmission switch 87. The seventh and eighth plug-in sets 76, 77 contain the monitoring and control devices 88, 89, 90 and the plug-in sets 78 and 79 contain the mains supply. Reference numeral 88 indicates a sound level generator, 90 a sound meter, 91 a device for producing a timing signal, 92 a monitoring unit, 93 a monitoring amplifier, 93a a signal relay, 93b a control limiter, 94 an electronic filter, 95 a mains rectifier, 95a a converter, 95b a microphone supply and 96 and a plug-in unit with batteries and charger. In accordance with this simple arrangement, the transverse connector 15 contains only keys 97 for switching on both equalizers, control keys 98, a type switch 99 and the folding indicator 100 of the sound meter.

In the following drawings, which demonstrate more clearly mechanical features connected with the assembly, the same reference numerals have been used as in the preceding drawings.

Figure 6:
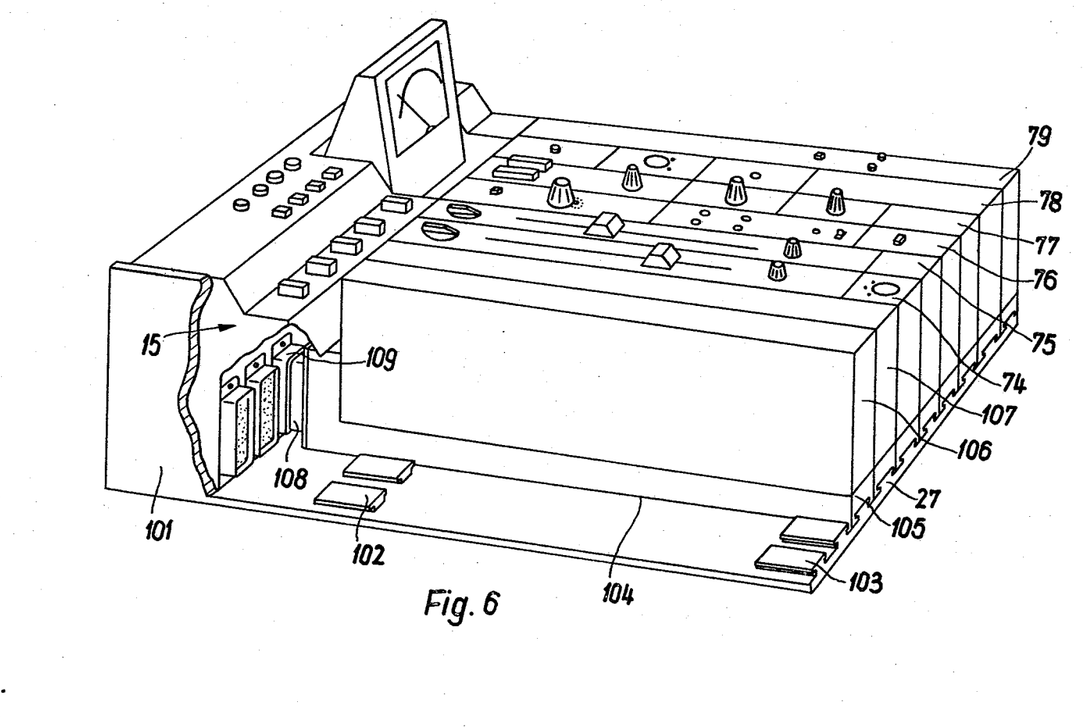
FIG. 6 shows in perspective and partly broken away a mixer desk, explaining the composition thereof.

As may be seen from FIG. 6, also the flat supporting structure 27 of a desk according to FIG. 5 is of plate-shaped construction and may have side walls 101, of which the front wall is recessed. This supporting structure is sub-divided into ten strips, on which the carrier sockets may be mounted. This is effected by mounting means 102, 103 for each carrier socket, corresponding to the mounting means 29 in FIG. 2, which co-operate with engaging means provided on the carrier sockets, such as outwardly projecting flanges. Such a flange is shown at 104 on the carrier socket 105.

On the carrier sockets are the structural elements. For the sake of clarity, the first two carrier sockets have been omitted in FIGURE 6 and, by way of example, the next two carrier sockets, corresponding to the microphone channels 72, 73 in FIG. 5, are replaced by empty boxes of a mixer desk under construction and still to be completed, the fitting with the microphone channel 74 and the plug-in units 75 to 79 can be seen (compare with FIG. 5). When the desk is to be completed, the empty boxes 106, 107 can be replaced by further microphone channels, corresponding to the parts 72 and 73.

It may be seen that each carrier socket, such as 105, carries a part 108 of a contact strip 14 (FIG. 2) whose other part 109 is arranged on the transverse connector insert 15. For example, one part 109 may have pins and the other 108 bushes. Obviously, the connection is made by pushing the carrier socket 105 on its mounting means, such as 102 and 103, towards the transverse connector 15.

Figure 7:
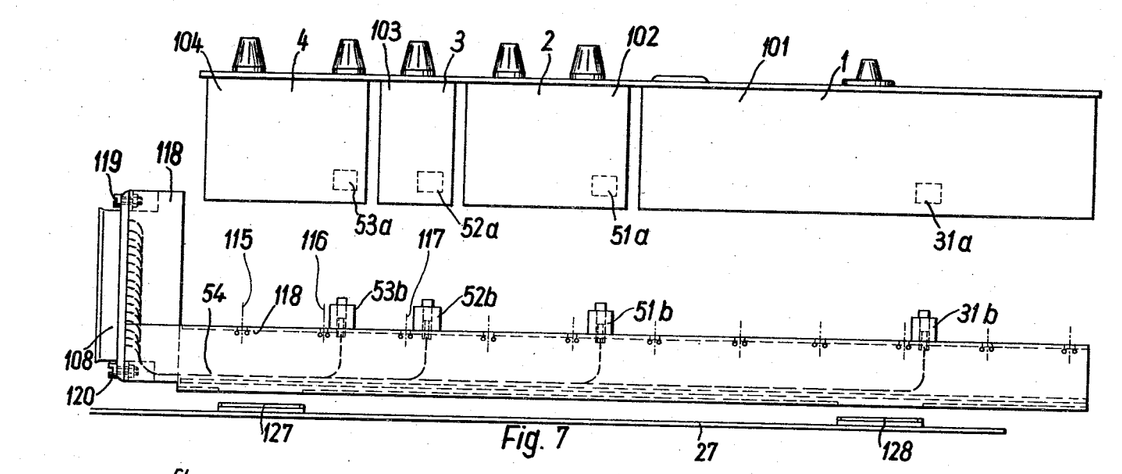
FIG. 7 shows on an enlarged scale a carrier socket according to FIG. 2 with detached housing and below the same a section of the carrier structure with the unit dimensions indicated.
Figure 8:
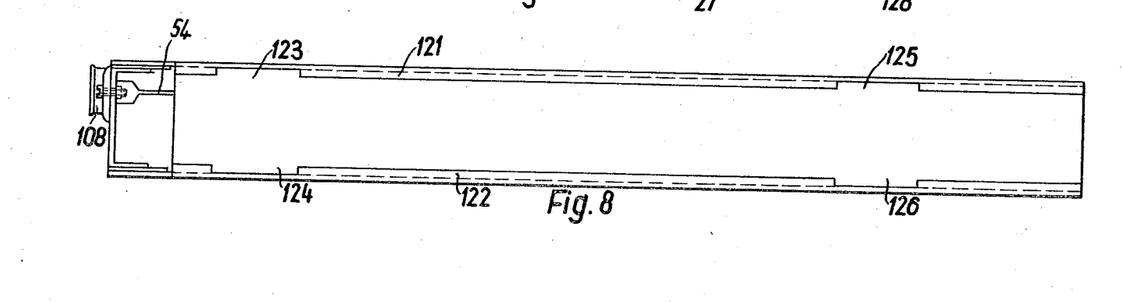
FIG. 8 is a view of the carrier socket of FIG. 7 from below.
Figure 9:
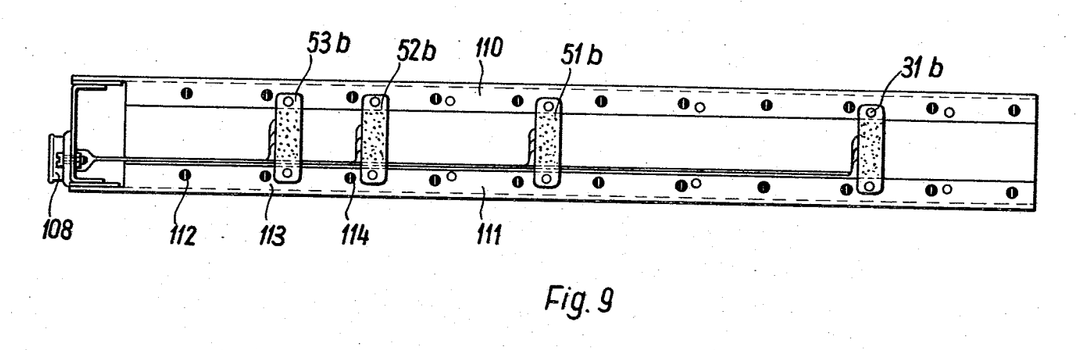
FIG. 9 is a view of the carrier socket of FIG. 7 from above.

In FIGURES 7 to 9, parts corresponding to those shown in FIG. 2 are marked with the same reference numerals as in this figure. However, here it is shown more clearly that the two upper supporting flanges 110 and 111 in the upper grid have holes 112, 113, 114 etc., adapted to receive screws 115, 116, 117 etc. for fixing the structural units. The contact strips 31b, 51b, 52b and 53b are detachably mounted in prepared orifices with regard to the grid, such as by screws, and engage during the fitting of the housings into the other parts 51a, 31a, 52a and 53a of the contact strips. This substantially simplifies the assembly.

The part 108 of a contact strip 14 (FIG. 2) is detachably mounted on the raised end face 118, such as by screws 119, 120 (see FIGURE 6), and carries the end of the cable loom 54 which connects the terminals.

Consequently, the prepared parts of the wiring can be kept in preparation for different combinations and may be equipped with their connecting means, adapted to be mounted easily and detachably on carrier sockets.

FIG. 8 shows that the side walls of the carrier sockets which are frame-shaped in this case, have on their underside inwardly projecting flanges 121, 122 which may be recessed at 123, 124, 125 and 126 in order to overlie outwardly projecting flanges 127, 128 of a supporting structure 27 and lock firmly during a longitudinal displacement for locking the contact strip 14.

A mixer control desk according to the invention has a number of operational and technical advantages, which will be outlined in the following. A particular advantage is that the spatial arrangement of a plug-in unit (channel) can be changed operationally from case to case by fitting the elements in a different sequence on to a correspondingly wired carrier socket. This makes it possible to mount the unit with the most frequently operated elements near the sound engineer.

In addition, the operational purpose of the mixer desk may be altered without structural changes, merely by changing the transverse connector insert—or only a part of its wiring harness—and fitting different plug-in units. Thus, for one production a large stereo recording with many microphone channels may be made, and this may be replaced easily by a ring circuit with conference circuit, requiring little production on the spot, but a large number of output channels.

Similarly, without interrupting the operation, a single change in the operating circuit may be made by preparing new plug-in units. The old units, being structurally uniform, can be used for other purposes after changing the wiring.

Furthermore, the operational circuit is divided into a large number of partial wiring sections and is therefore easily accessible. These partial wiring sections may be tested and repaired outside the mixer desk, e.g., in the workshop or on the test bench. Hence, the mixer desk need not be positionally changed for testing, or be provided with a folding top.

Also the planning of a mixer desk has been substantially simplified. The organization ordering the desk need only determine the probable extent of the installation (possibly with a view to further extensions) and its fitting with units which may be bought according to a list, as is usual at present. The structural planning relates substantially to the length and width of the simple carrier structure, resulting from the length and number of the plug-in units, with the dimensions of the pass and guide members, and the construction of the transverse connector insert, which may be selected from two or three sizes. The final operational circuit need not be available until shortly before the completion of the mixer desk. A desk with many special requests can therefore be manufactured so economically that the risky series production of unit desks offers scarcely any advantages.

Also the preparation of the total circuit is substantially simplified by dividing it into sections. Since these parts extend substantially only along one axis, the circuit may be determined in the form of tables, eliminating the expensive planning and drawing of comprehensive circuitry.

Finally also, the manufacture of the basic equipment becomes very economical, owing to the division into a number of partial operations which can be carried out in parallel. This concerns both the structural elements consisting of uniform parts (carrier sockets, program groups, parts of the transverse connector and its invariably used mounting straps, etc.), and the wiring of all units, wherein preferably the wiring is manufactured for the carrier sockets outside the same and is then fitted as a whole. This prefabrication of the parts and their storage outside the workshop reduce the time required for the assembly, the tying-down time for investment capital, and the delivery times.

By way of summary it may be stated that the features of the invention make it possible to plan mixer control desks freely, to manufacture them rationally in spite of individual equipment, using nevertheless the principles of series production, and to adapt them later to changing operational conditions.

It should also be noted that the invention may also be applied to operating desks outside the field of radio engineering, where the same condition regarding the uniform construction of the components can be observed.

In the field of sound broadcasting it has been possible to provide all conditions for using fully the advantages of the invention. Reference is made in this conjunction to FIGURE 5, showing, by way of example, a transportable mixer control desk, in which all units, including the power pack sections with batteries and charging device are constructed uniformly and combined to plug-in units.

I claim:

1. A control mixing desk, with variable operating circuitry, particularly designed for use in a sound studio, said desk comprising, in combination, means providing a plane substantially horizontal support surface; relatively elongated supporting bases disengageably mountable on said support surface in laterally juxtaposed relation with each other, said supporting bases all having substantially the same width, which is a fraction of the width of said support surface, and the width of said support surface being an integral multiple of the width of said supporting bases and equal to the combined width of a plurality of the latter; first disengageable mechanical connecting means, including interengageable connecting elements on said support surface and on a substantially flat undersurface of each supporting base, disengageably connecting said supporting bases to said support surface; the connecting elements on said support surface being arranged at uniform lateral spacings therealong equal to the width of a supporting base; structural units all having the same height and each having a width equal to that of said supporting bases, each structural unit having a respective length equal to a basic length measure or to a multiple of said basic length measure; all of said supporting bases having the same length which is an integral multiple of said basic length measure; each structural unit including a respective housing; second disengageable mechanical coupling means disengageably connecting structural units to said supporting bases; plural structural units being mounted on a supporting base in end-to-end relation to form, with the supporting base, a slide-in insert, the slide-in inserts all having the same length; transverse connector insert means extending along one edge of said support surface transversely of said supporting bases; third disengageable mechanical connecting means disengageably connecting said insert means to said support surface directly adjacent the end faces of said supporting bases; said structural units respectively accommodating, as independent electrical assemblies with associated respective electrical connecting means, the active components of said control mixing desk selected from the group consisting of amplifiers, limiters, control devices and power supplies; wiring in each supporting base; first electrical connecting means connected to said wiring and disengageably connectable to the electrical connecting means of a structural unit upon mounting of the structural unit on a supporting base; cabled conductor groups in said insert means connected between external terminals of said mixer control desk and second electrical connecting means respective to each supporting base mounted on said support surface and each at the same location relative to the end face of a supporting base; and third electrical connecting means connected to the wiring of each supporting base and disengageably connectable to said second electrical connecting means upon sliding insertion of a supporting base onto said support surface.

2. A mixer control desk, as claimed in claim 1, in which said second and third electrical connecting means comprise interengageable plug and socket connectors engaged upon such sliding insertion of a supporting base onto said support surface.

3. A mixer control desk, as claimed in claim 1, wherein said transverse connector insert is interchangeably mounted on said support surface and mounts input and output terminals for said mixer control desk, and keys and switches connected to said cabled conductor groups for selecting said structural units.

4. A mixer control desk, as claimed in claim 1, wherein the electrical connecting means of said structural units and said first electrical connecting means comprise plug and socket connectors; the electrical connecting means of said structural units being recessed within the housing thereof and the said first electrical connecting means projecting into the housing of a structural unit to effect the electrical interconnection to the wiring of the supporting base.

5. A mixer control desk, as claimed in claim 1, in which said second disengageable mechanical coupling means and said electrical connecting means of said structural units are, with respect to each structural unit, always at the same respective longitudinal locations relative to a defining end of each structural unit.

6. A mixer control desk, as claimed in claim 1, wherein each supporting base is formed with apertures receiving said second disengageable mechanical coupling means on said structural units, which latter are in the form of fastening elements receivable in said apertures; each supporting base being further formed with apertures receiving fastening elements receivable in said apertures; each supporting base being further formed with apertures receiving fastening elements securing said first electrical connecting means thereto.

7. A mixer control desk, as claimed in claim 1, wherein said first disengageable mechanical connecting means includes connecting elements on each supporting base and mating connecting elements on said support surface, said interengageable connecting elements mechanically guiding each supporting base laterally and vertically relative to said support surface.

8. A mixer control desk, as claimed in claim 1, including programming means arranged in said transverse connector insert means, each programming means being respective to a different supporting base; means combining said respective programming means to form structural and completely wired units; said programming means being interchangeably mounted in said transverse connector insert means.

9. A mixer control desk, as claimed in claim 1, in which said cabled conductor groups in said insert means are divided lengthwise thereof into sub-groups each respective to a particular supporting base; third electrical connecting means connected to said sub-groups and selectively operable to interconnect adjacent sub-groups; at least certain of said sub-groups being exchangeably mounted in said transverse connector insert means.

References Cited

UNITED STATES PATENTS

| | | | |
|---|---|---|---|
| 2,536,289 | 1/1951 | Johnson et al. | 317—99 XR |
| 2,892,153 | 6/1959 | Neill | 317—99 XR |
| 2,922,135 | 1/1960 | Hoberg et al. | 317—99 XR |
| 3,256,479 | 6/1966 | Edwards | 317—99 XR |

ROBERT K. SCHAEFER, Primary Examiner

J. R. SCOTT, Assistant Examiner

U.S. Cl. X.R.

317—99